United States Patent [19]

Treiber

[11] Patent Number: 4,705,588
[45] Date of Patent: Nov. 10, 1987

[54] METHOD AND APPARATUS FOR PACKAGE LABELING

[75] Inventor: Fritz F. Treiber, Centerville, Ohio

[73] Assignee: Hobart Corporation, Troy, Ohio

[21] Appl. No.: 887,779

[22] Filed: Jul. 21, 1986

[51] Int. Cl.$^4$ .................................. G01G 23/38
[52] U.S. Cl. .................................. 156/360; 53/137; 53/441; 53/502; 53/556
[58] Field of Search .................. 156/360; 53/415, 441, 53/137, 556, 586

[56] References Cited

U.S. PATENT DOCUMENTS

| | | | |
|---|---|---|---|
| 3,650,773 | 3/1972 | Bush et al. | 99/171 R |
| 4,415,048 | 11/1983 | Teraoka | 177/5 |
| 4,432,187 | 2/1984 | Elsner et al. | 53/586 X |
| 4,458,470 | 7/1984 | Fine | 53/502 |
| 4,543,766 | 10/1985 | Boshinski | 53/64 |
| 4,548,024 | 10/1985 | Fine | 53/502 |

Primary Examiner—David Simmons
Attorney, Agent, or Firm—Biebel, French & Nauman

[57] ABSTRACT

A method and apparatus for package labeling is incorporated into a packaging machine wherein packages to be wrapped and labeled are conveyed from a package input station to a package wrapping and labeling station whereat an elevator raises packages into sections of wrapping material which are then wrapped about the packages. A label supply delivers labels for the packages to a label delivery station, and a label applicator is positioned over the elevator for receiving the labels from the label delivery station and applying them to sections of wrapping material prior to packages being wrapped therein. The labeling arrangement is best adapted for use in a packaging machine wherein the wrapping material is stretch film, and the sections of wrapping material are prestretched prior to application of labels thereto.

12 Claims, 9 Drawing Figures

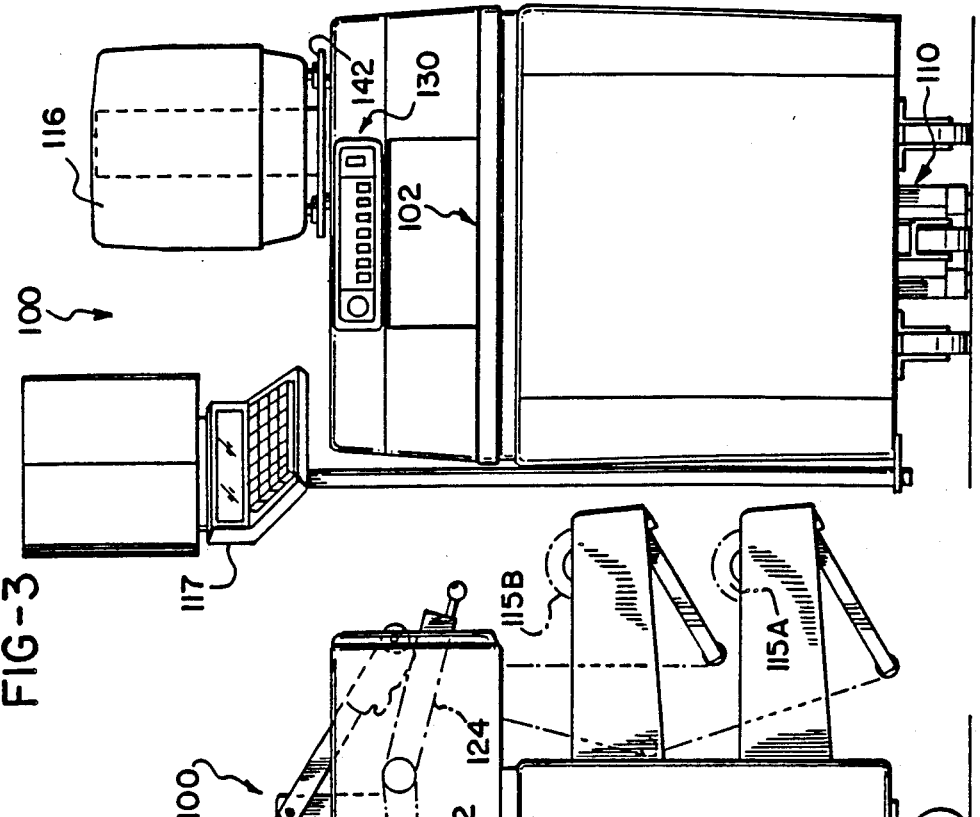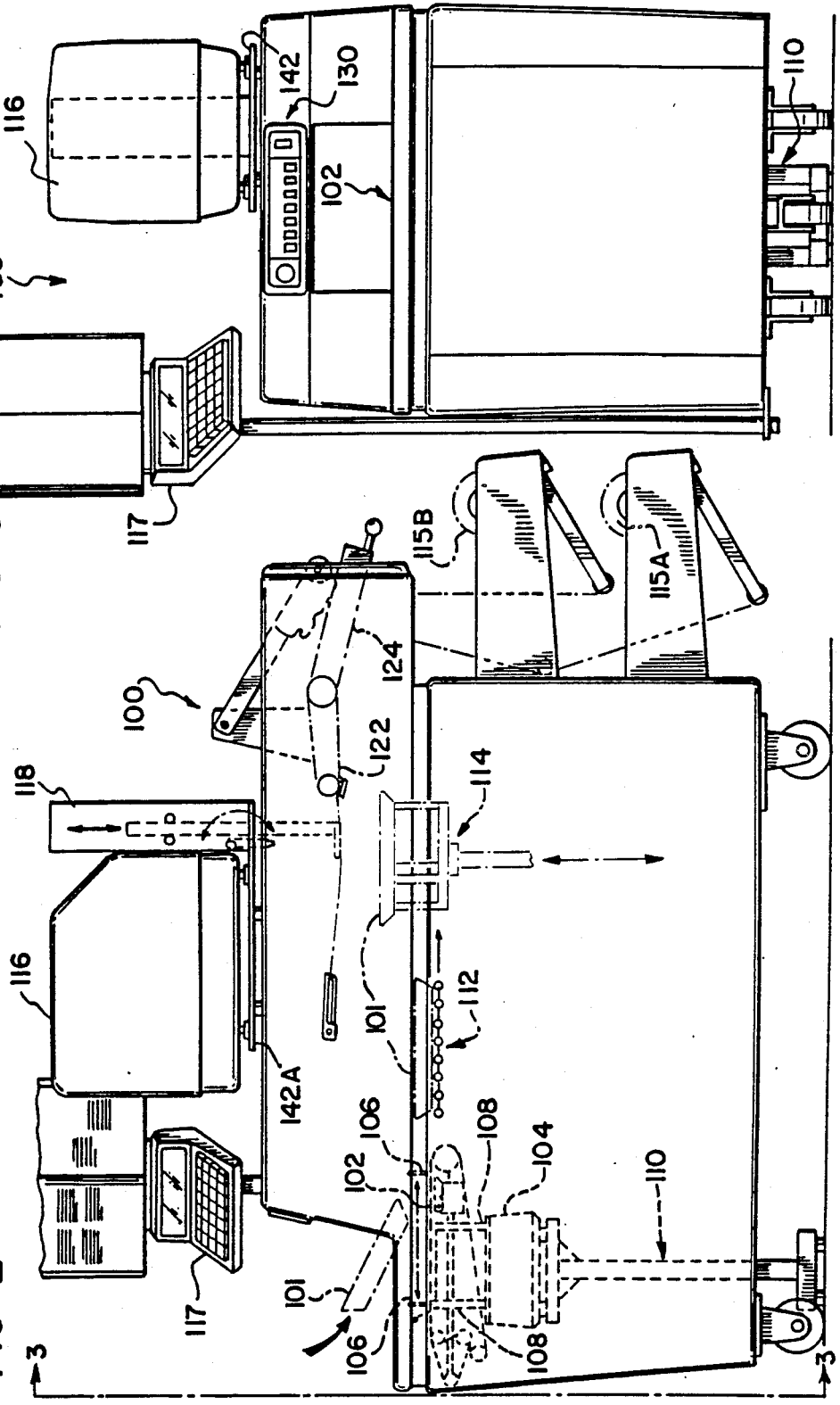

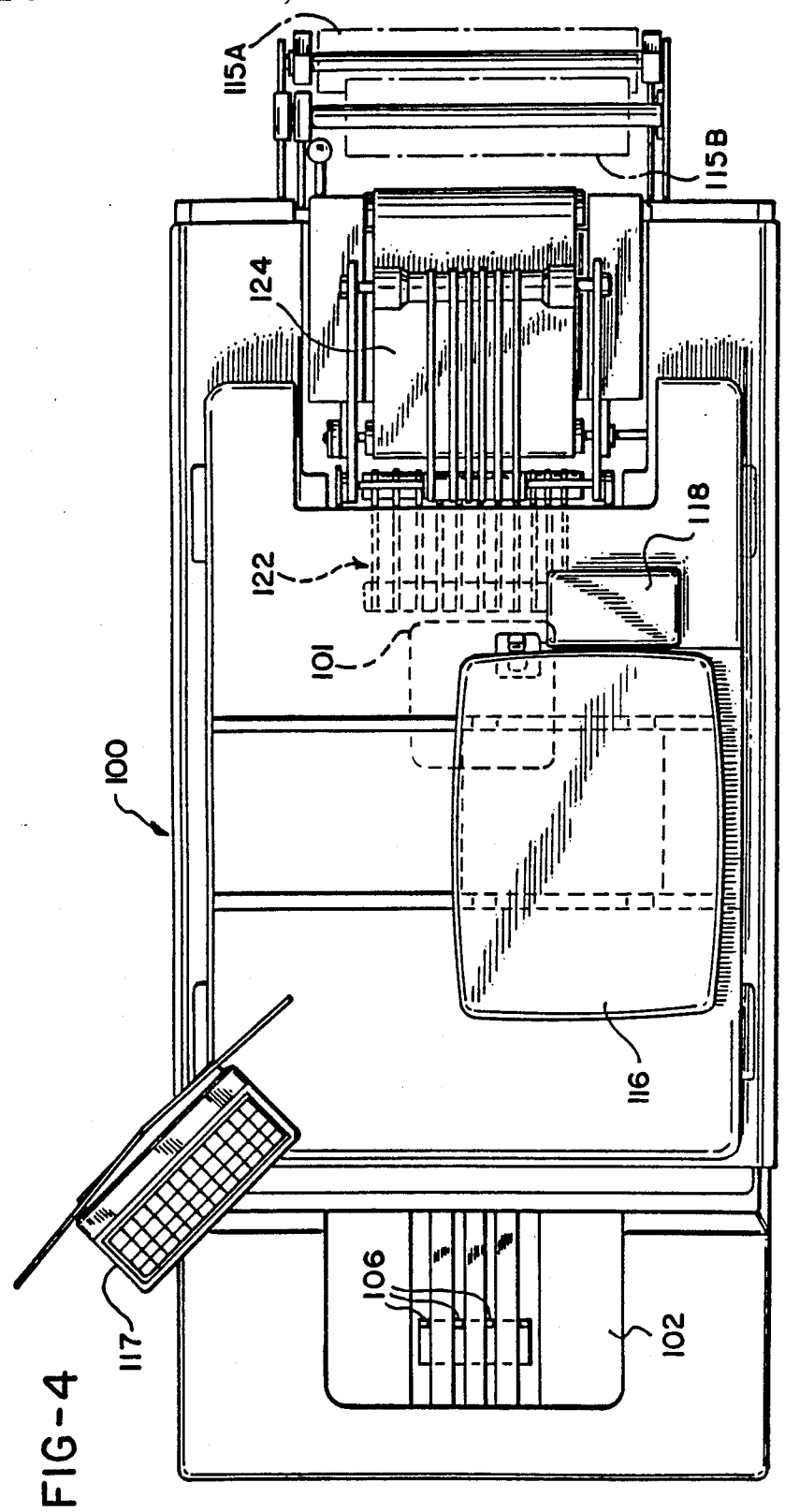

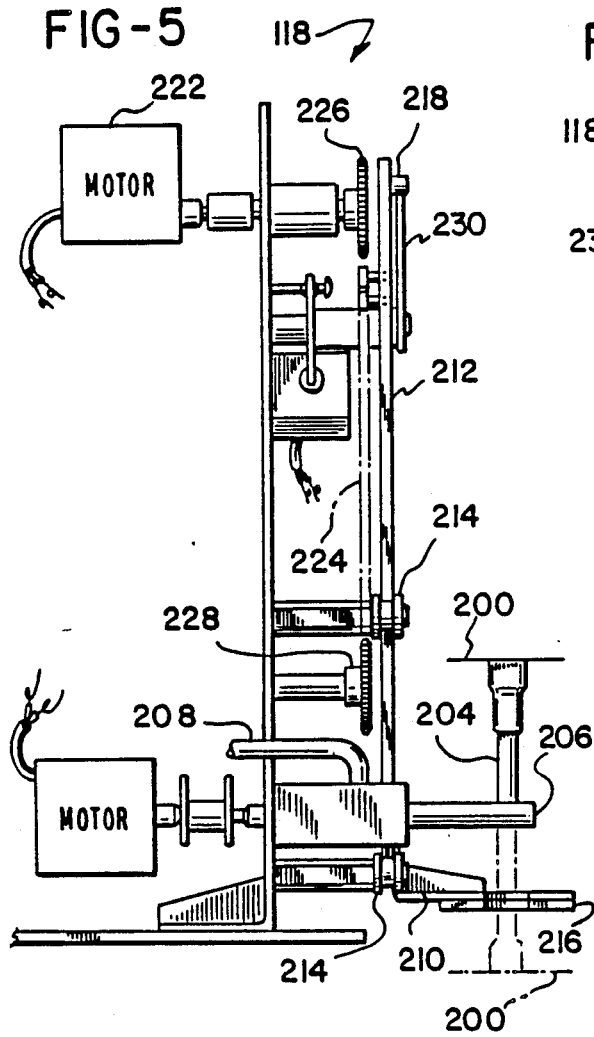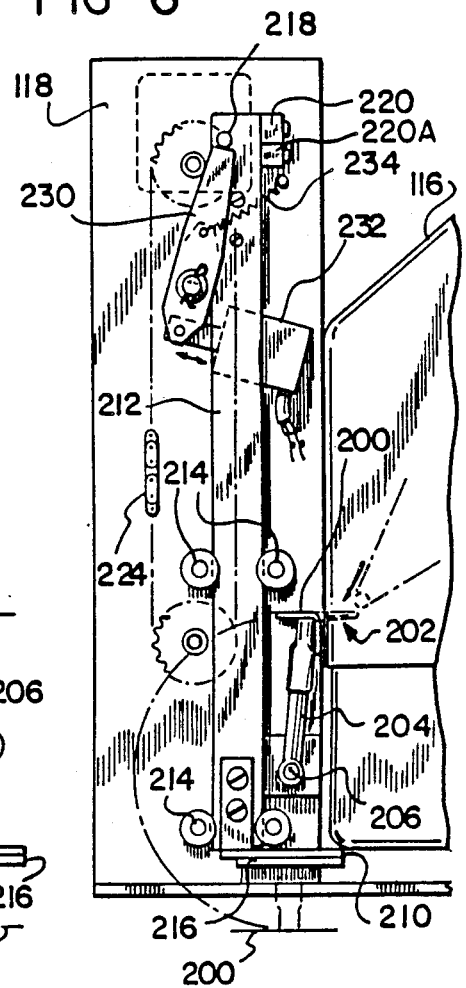

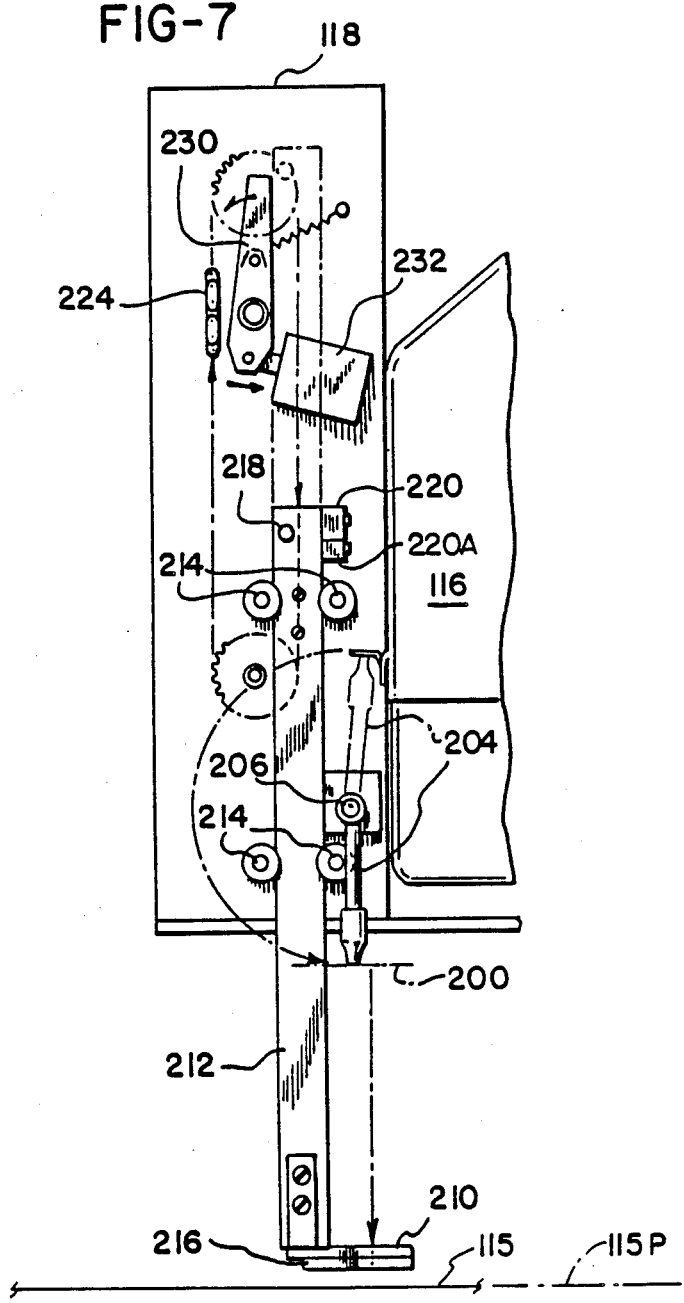

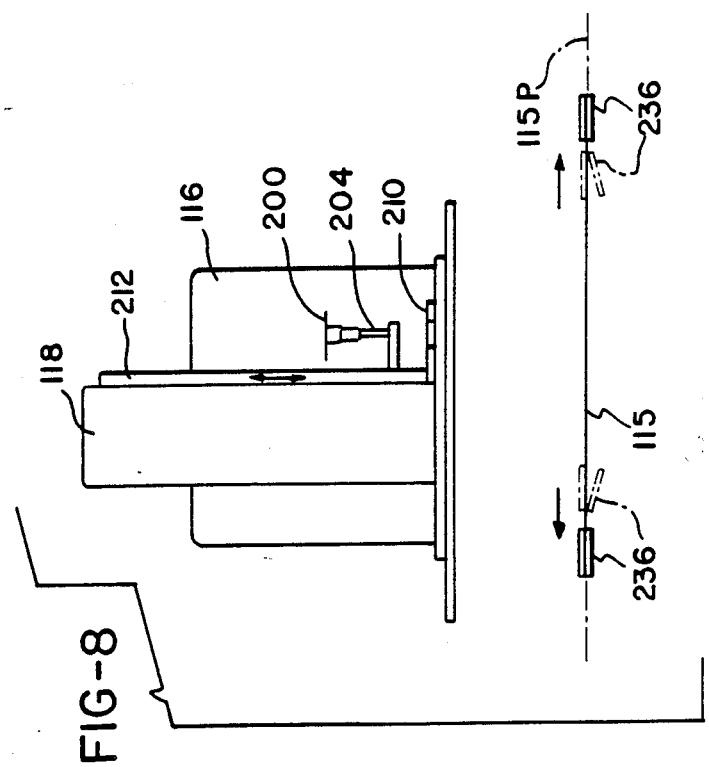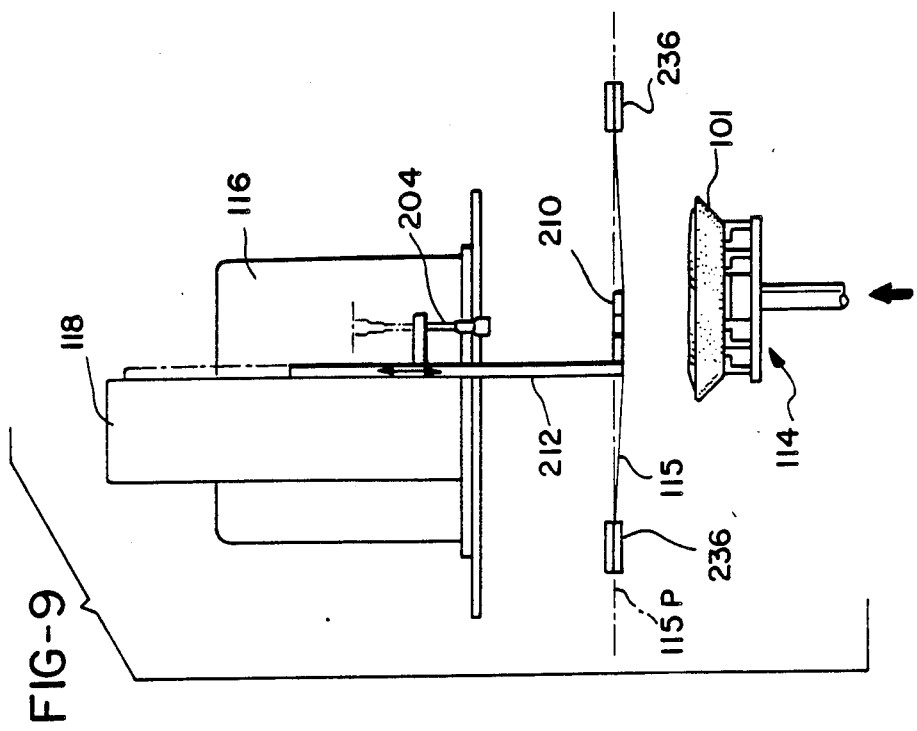

METHOD AND APPARATUS FOR PACKAGE LABELING

BACKGROUND OF THE INVENTION

This invention relates generally to packaging machines and, more particularly, to a method and apparatus for package labeling in such machines wherein labels are applied to sections of wrapping material prior to packages being wrapped therein.

A number of package wrapping machines are well known and used, for example, in supermarkets for packaging meats, produce and other food items. Such wrapping machines may provide at least two different widths of wrapping material to accommodate a large variety of package sizes. The wrapping material is provided in continuous rolls of different widths such that the length and width of sheets of wrapping material may be selected for wrapping packages. The length and width of a sheet of wrapping material to be used for a given package may be selected by the operator based on the package to be wrapped or may be automatically selected based on machine-sensed dimensions of the package.

Computing weighing scales and labelers which print and apply price labels to packages are oftentimes associated with wrapping machines. A computer or other electronic means is included within the scale or labeler for calculating prices for the packages. Prices are calculated by multiplying the net weight of a package times the price per unit weight of the commodity within the package, the unit price having been previously stored into a memory of the computer. Commodity net weight is determined by compensating for the tare weight or weight of the packaging material.

In the operation of a prior art packaging system, a commodity to be packaged is initially placed onto a supporting tray. The trayed commodity or package is then fed into the wrapping machine where a sheet of packaging material, typically transparent stretch film, is wrapped about the package and secured beneath the tray. The wrapped package is then conveyed either mechanically or manually to a combination scale and labeler. At the scale and labeler, the price of the package is computed, a price label is printed and the label is applied to the package.

In order to conserve space, packaging systems have combined a weighing scale, a wrapping machine and a label printer into a single unit. See, for example, Teraoka, U.S. Pat. No. 4,415,048, wherein a trayed commodity is initially placed onto a weighing scale which forms the input of a wrapping machine. The trayed commodity is weighed, wrapped and passed to a package outlet passage along which a labeler is positioned to generate a pricing label and apply the label to the wrapped package. In the Teraoka packaging system, labels are printed and applied downstream from the wrapping station along a wrapped package outlet passage such that labeling information must be stored and delayed or large gaps must be placed between consecutive packages for labels to correspond correctly to wrapped packages. Package labeling is also effected along a package outlet passage in an integrated packaging machine disclosed in Fine, U.S. Pat. Nos. 4,458,470 and 4,548,024.

To overcome the problems created by having to store and delay the weight signals of packages or the packages themselves progressing through a packaging machine, an improved packaging system is disclosed in Boshinski, U.S. Pat. No. 4,543,766, which is incorporated herein by reference. In the Boshinski packaging system, the wrapping machine is an elevator-type machine presently quite popular in the supermarket industry. A labeler is positioned over the elevator and a weighing conveyor extends between a package feed-in tray and the elevator such that a package is weighed as it is conveyed to the elevator, a label is printed and applied to the package as the package is wrapped, by elevation into a sheet of wrapping material.

Package labeling over the elevator of an elevator-type machine is also disclosed in Treiber, U.S. Pat. No. 4,615,757. In the Treiber system, labeling apparatus is shifted horizontally relative to the wrapping machine for positioning labels within selected labeling regions on packages which are labeled as the packages are wrapped.

In all of the known prior art labeling arrangements for such machines, labels are applied either to fully wrapped packages or to packages as they are being wrapped such that the labels are applied to an upper package surface which oftentimes is lumpy or irregular. Application of labels to such surfaces can lead to incomplete label adhesion, wrinkled labels which may affect scannability when UPC codes are used, and/or could even pierce the wrapping material if a sharp bone edge or the like is struck by the label applicator. Hence, the need exists for an improved method and apparatus for package label application which overcomes these problems of the prior art.

SUMMARY OF THE INVENTION

It is a primary object of the present invention to provide an improved method and apparatus for labeling packages in a packaging machine by applying labels corresponding to the packages to sections of wrapping material prior to the packages being wrapped therein.

According to one aspect of the present invention, a packaging machine wherein packages to be wrapped and labeled are conveyed from a package input station to a package wrapping and labeling station where an elevator raises packages into sections of wrapping material which are then wrapped about the packages includes a package labeling arrangement which comprises label supply means for delivering labels for the packages to a label delivery station, and label applicator means positioned over the elevator for receiving labels from the label delivery station of the label supply means and applying the labels to the sections of wrapping material prior to the packages being wrapped therein.

The labeling arrangement is most advantageously used in a packaging machine wherein the wrapping material comprises stretch film, and the sections of wrapping material are prestretched prior to application of the labels thereto. The sections of wrapping material are preferably held in a defined plane prior to packages being raised thereinto, and the label applicator means comprises a label applier having a label applying head for engaging labels at the label delivery station and moving the labels into adhesive engagement with the sections of wrapping material, the label applier head being moved to a position below the defined plane to ensure adhesive engagement of the labels with the sections of wrapping material. The label applying head may be returned toward the label delivery station prior to packages being raised into the sections of wrapping material, or may be at least partially raised by packages being raised into the sections of wrapping material.

According to another aspect of the present invention, a packaging machine for weighing, wrapping and labeling packages containing known commodities comprises a package input station for receiving packages into the machine, a combined package wrapping and labeling station including a vertically reciprocating elevator for raising packages positioned thereon into sections of wrapping material to be wrapped about the packages, and package transporting means for conveying packages from the package input station to the elevator of the combined package wrapping and labeling station. Weighing means are positioned along the package transporting means for sensing the weight of packages placed onto the package input station. A label printer is located at the combined package wrapping and labeling station for printing package information including package price onto labels to be applied to the packages. A label applicator is positioned over the elevator at the package wrapping and labeling station for receiving labels printed by the label printer and applying them to the upper surface of sections of the wrapping material prior to elevation of packages thereinto. Processor means are provided for computing the price to be printed on the labels, with the processor means including storage means and an input section for receiving unit pricing information regarding the commodities within the packages and being connected to the weighing means and the label printer.

In accordance with yet another aspect of the present invention, a method of package labeling performed in a packaging machine wherein packages to be wrapped and labeled are conveyed from a package input station to a package wrapping and labeling station where an elevator raises packages into sections of wrapping material which are then wrapped about the packages comprises the following steps: drawing a section of wrapping material into the package wrapping and labeling station over the elevator; conveying a package onto the elevator at the wrapping/labeling station; applying the label to the section of wrapping material; elevating the package into the section of wrapping material; and, wrapping the section of wrapping material about the package. In a packaging machine wherein the wrapping material comprises stretch film, the method of package labeling in accordance with the present invention preferably further comprises the step of prestretching the section of wrapping material before applying a label thereto.

Other objects and advantages of the invention will be apparent from the following description, the accompanying drawings and the appended claims.

BRIEF DESCRIPTION OF THE DRAWINGS

FIGS. 2-4 are a side view, an operator's end view and a top view, respectively, of the packaging machine of FIG. 1.

FIGS. 5-7 show an illustrative embodiment of a label applicator for use in the present invention.

FIGS. 8 and 9 schematically illustrate package labeling in accordance with the present invention.

DETAILED DESCRIPTION OF THE INVENTION

Figure 1:
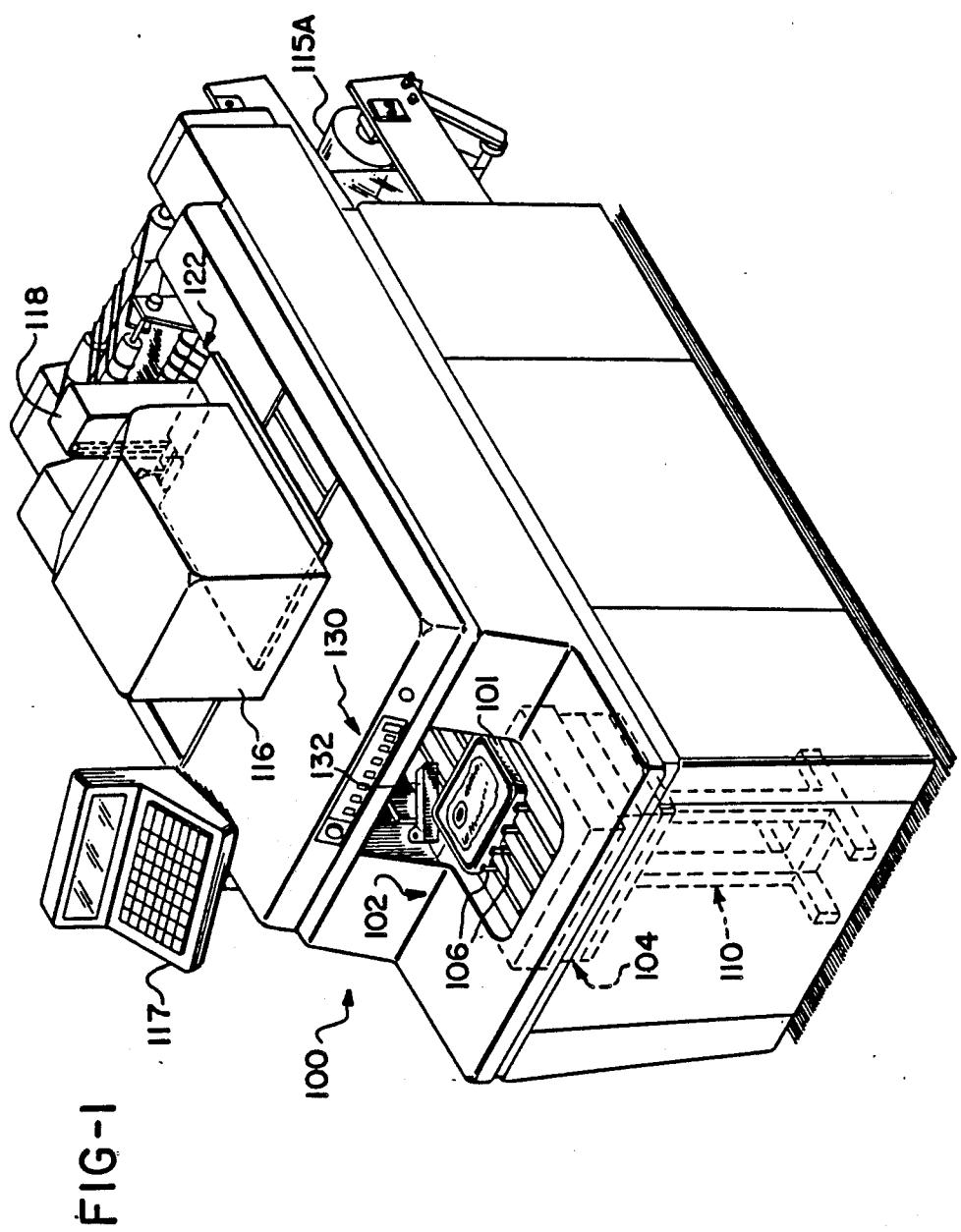
Fig. 1 is a perspective view of a packaging machine including the invention of the present appli- cation.

Overall operation of a package elevating wrapping machine is fully described in Treiber et al., U.S. Pat. No. 4,501,106 which is incorporated herein by reference. The operation of such a wrapping machine wherein a labeler is positioned over an elevator and a weighing conveyor extends between a package input station and the elevator such that the package is weighed as it is conveyed to the elevator and a label is printed and applied to the package as the package is wrapped by elevation into a sheet of wrapping material is disclosed in the above-referenced U.S. Pat. No. 4,543,766. Further, the operation of such a wrapping machine wherein a labeler is positioned over an elevator and shifted horizontally based on package size to thereby control the position of labels which are applied to the packages as they are being wrapped is disclosed in U.S. Pat. No. 4,615,757 which is assigned to the assignee of the present application and incorporated herein by reference. Accordingly, the description of the operation of a package elevating wrapping machine will be limited to that necessary for describing the label application of the present invention. For a more detailed description of wrapping and packaging machines, the referenced patents should be consulted.

It is noted that the present invention is broadly directed to a method and apparatus for package labeling wherein labels are applied to sections of wrapping material before the packages are wrapped therein. While extremely high packages may contact the wrapping material substantially simultaneously with a corresponding label, or in odd instances, before label contact, such early package contact may defeat the advantages of the present invention, and hence, should be avoided. Preferably, the wrapping material comprises stretch film which is prestretched prior to label application. The invention is not limited to any particular packaging machine design; however, the invention is particularly applicable to integrated packaging systems which include a wrapping machine, a weighing scale and a labeler and hence, the invention will be described with reference to such a system.

FIG. 1 is a perspective view of a packaging machine 100 incorporating the invention of the present application. Operation of the packaging machine 100 will now be described for weighing, wrapping and labeling a package 101. Although a number of packages are shown throughout the drawings, and these packages may vary in size, they will be generically indicated by the numeral 101. The package 101 typically comprises meat or other food products placed upon a tray, i.e., a trayed commodity, which is to be wrapped in stretchable film for attractive display. In addition, the trayed commodity is to be weighed and appropriately price labeled and/or labeled with a hi-lite label which provides additional information to a consumer by identifying or "hi-liting" characteristics of the product. For example, hamburger may be designated as "fresh ground," pork chops as "thin cut" or "thick cut," a certain roast beef as the "special of the day," and so forth.

In any event, the package 101 is placed into a package input station generally defined by an input tray 102. In the illustrated embodiment, the input tray 102 forms a weighing platter for a scale 104. The input tray 102 is slotted to receive a package pusher 106 which is operable for advancing the package 101 into the packaging machine 100. As best shown in FIGS. 1 and 2, the input tray 102 is supported by vertical members 108 to form the weighing platter for the scale 104. The scale 104 and, in turn, the input tray 102 forming the scale platter are supported by a stand 110 directly from the floor and independent of the remainder of the packaging machine 100 such that vibrations within the packaging machine 100 do not affect weights determined by the scale 104 or the stability of the scale 104.

As best shown in FIG. 2, the package 101 is initially placed into the input station, i.e., onto the input tray 102, where it is weighed by the scale 104. Upon obtaining a stable weight for the package 101, the package pusher 106 is activated to push the package 101 further into the packaging machine 100. The package pusher 106 may be of any appropriate design with one possible design being disclosed in referenced U.S. Pat. No. 4,615,757.

The package pusher 106 is operated in synchronism with package conveyors 112 to convey the package 101 to an elevator 114. As the package 101 is conveyed toward the elevator 114, size dimensions of the package 101 are measured. Based on the measured package dimensions, an appropriate film width and length are determined for wrapping the package 101. The film width and length define a film sheet 115 which is drawn into the machine in a defined film plane 115P from a selected one of two continuous sources of film 115A and 115B and the film sheet 115 is prestretched. The elevator 114 then elevates the package 101 into the prestretched film sheet 115 which is wrapped about the package 101.

Label application in accordance with the present invention is inserted into this sequence between film sheet prestretch and package wrapping. Once weight signals are stably determined by the scale 104, those stable weight signals are passed to a price labeler 116 which calculates a price for the package 101 and generates a price label. The price for the package 101 is determined in a well known manner by applying a unit price for the trayed commodity to the net weight for the trayed commodity. Both the unit price and commodity identification were previously entered by an operator via a keyboard 117, and the net weight is determined from the gross weight designated by the stable weight signals by subtracting a tare weight, i.e., the weight of the packaging material, for the package 101. The price label generated by the price labeler 116 is passed to a label applicator 118 which in turn applies the price label to a prestretched section of film prior to the package 101 being wrapped therein.

Alternately, or at the same time, a hi-lite labeler (not shown) may be applying a hi-lite label to the prestretched film section. The hi-lite label may be either preprinted or it may be printed by the hi-lite labeler which may be the same as the price labeler 116 and label applicator 118 or may be of another appropriate design. The package 101 thus weighed, wrapped and labeled with a price label and/or a hi-lite label is ejected onto a package conveyor 122 which carries the package 101 to a sealing conveyor 124 to complete the wrapping operation and to pass the completed package 101 from the packaging machine 100.

In accordance with the present invention, the price label applicator 118 and/or a hi-lite labeler (not shown) are operated in synchronism with the package wrapping of the packaging machine 100 to provide an improved method and apparatus for labeling packages by applying labels corresponding to the packages to sections of wrapping material prior to the packages being wrapped therein.

Mechanical operations for applying labels to sections of wrapping material prior to wrapping packages therein are substantially in accordance with Treiber, U.S. Pat. No. 4,561,921, which is incorporated herein by reference. Due to the space constraints of the invention of the present application, the label applicator design of referenced U.S. Pat. No. 4,561,921 is not directly applicable and, hence, an illustrated embodiment of the label applicator 118 is shown in FIGS. 5–7.

Printing of a price label 200 and delivery of the label 200 to a label delivery station 202 is in accordance with referenced U.S. Patent No. 4,561,921. The label 200 is discharged from the price labeler 116 with its adhesive coated side facing upward and its printed side facing downward. A label transfer nozzle 204 is pivotable about a horizontal axis 206 between a first position in which it engages the printed side of the label 200 by means of vacuum supplied through a vacuum line 208 and a second position illustrated in FIG. 7 in which the adhesive coated side of the label 200 is facing generally downward. The vacuum is connected through the transfer nozzle 204 to an elongated vacuum port (not shown) in the distal end of the transfer nozzle 204.

An applicator head 210 removes the label 200 from the transfer nozzle 204 when the transfer nozzle 204 is in its second position. The applicator head 210 is connected to a gravity label applier member 212 which is supported for free vertical movement by rollers 214. The applicator head 210 may include a resilient facing pad 216 to cushion the application of the label 200. The gravity label applier member 212 includes a control pin 218 and a stop member 220 both extending from the upper end of the gravity label applier member 212.

The stop member 220 limits the downward movement of the gravity label applier member 212 such that the label applicator head 210 is moved to a position below the film plane 115P. The film plane 115P, as previously noted, is the plane in which film is drawn into the machine 100 and prestretched as is well known in the art. It is preferred to apply labels to the film only after the film is prestretched; however, the invention of the present application is also applicable to machines which do not prestretch the film at all or do not prestretch the film appreciably. The application of labels to prestretched film sheets prevents the formation of film creases or wrinkles which may otherwise radiate from a label applied to limp film and later stretched about a package. Further, such label application is made to a flat, taut surface to ensure secure adhesive engagement as opposed to prior art labeling arrangements wherein labels are applied to package surfaces which are lumpy, irregular and may include objects, such as sharp bone edges and the like, which may damage film as a label is applied.

Prior to label application, the gravity label applier member 212 is raised to its uppermost position by a motor 222. The motor 222 drives a chain 224 which is trained around a sprocket 226 driven by the motor 222 and an idler sprocket 228. The chain 224 is connected to the gravity label applier member 212 such that when the motor 222 is operated, the gravity label applier member 212 is raised to its uppermost position where the control pin 218 is engaged by a lever arm 230 and thereby locked into its uppermost position.

When a film sheet 115 has been drawn into a defined plane 115P in the machine 100 and prestretched in accordance with known wrapping techniques and a label 200 has been moved to the second position as shown in FIG. 7, a solenoid 232 is activated to move the lever arm 230 such that it disengages the control pin 218 and, since the motor 222 is not activated, the gravity label applier 212 and the label applicator head 210 are free to fall and thereby engage the label 200 and firmly apply it to the upper surface of the prestretched film sheet 115 prior to the film being wrapped about the package 101. The label applier 212 is moving downward in FIG. 7 wherein it is apparent that the applicator head 210 will be moved to a position below the film sheet 115, and hence, the film plane 115P when the label applier 212 is stopped by the stop member 220. The stop member 220 may include a resilient portion 220A to at least partially absorb the shock of the stop member 220 engaging one of the rollers 214. Of course, other shock absorbing arrangements can be included in the label applier 118, if desired.

After label application, the motor 222 is once again activated to raise the gravity label applier member 212 to its uppermost position. The label applier member 212 may be immediately raised by the motor 222 or can await engagement of the film sheet 172 by the package 101 to be wrapped prior to activation of the motor 222. The solenoid 232 is released and a tension spring 234 returns the lever arm 230 to a position such that the control pin 218 is again engaged by the lever arm 230 and the gravity label applier member 212 is once again latched in its uppermost position as shown in FIG. 6. This sequence is repeated for each of the packages processed by the packagihg machine 100.

Reference is now made to FIGS. 8 and 9 which schematically illustrate package labeling in accordance with the present invention to summarize such package labeling. As shown in FIG. 8, a sheet of film 115 has been drawn into the machine in response to a package 101 which has been weighed, conveyed to the elevator 114, and will ultimately be raised into and wrapped by the sheet 115. In response to stable weight signals, a label 200 is printed by the price labeler 116 and delivered to a label delivery station positioned over the transfer nozzle 204 as previously described. The film sheet 115 is gripped by film side clamps 236 and prestretched prior to package wrapping as is known in the art.

As the film sheet 115 is being prestretched, the transfer nozzle 204 is moved to its second position as shown in FIG. 9 such that the label 200 is positioned beneath the applicator head 210. The gravity label applier member 212 is then dropped such that the applicator head 210 removes the label 200 from the transfer nozzle 204 and continues in a downward direction into firm contact with the prestretched film sheet 115. The label applicator head 210 is moved to a position below the defined plane 115P in which the film sheet 115 was initially drawn and prestretched. In this way, the label 200 is firmly engaged to the upper surface of the prestretched film sheet 115 prior to contact with the film sheet 115 by the package 101 being elevated on the elevator 114 as shown in FIG. 9. The gravity label applier member 212 may then be raised to its original position shown in FIG. 8 prior to contact with the film sheet 115 by the package 101, or elevation of the package 101 may partially raise the gravity label applier member 212 which may then be returned to its raised position as shown in FIG. 8.

The above description of an illustrative embodiment of the present invention clearly provides label application to a film sheet prior to wrapping the film sheet about a package within an integrated packaging system. As will be apparent to those skilled in the art, the invention of the present application is broadly applicable to label application to film sheets held in a defined plane whether or not prestretched. Accordingly, the invention is generally applicable to any packaging system wherein it is desired to securely affix labels to sheets of wrapping material prior to wrapping packages in those sheets of wrapping material.

While the method herein described and the form of apparatus for carrying this method into effect constitutes a preferred embodiment of this invention, it is to be understood that the invention is not limited to this precise method and form of apparatus and that changes may be made in either without departing from the scope of the invention which is defined in the appended claims.

What is claimed is:

1. In a packaging machine wherein packages to be wrapped and labeled are conveyed from a package input station to a package wrapping and labeling station where an elevator raises packages into sections of wrapping material which are then wrapped about said packages, a package labeling arrangement comprising:
   label supply means for delivering labels for said packages to a label delivery station; and
   label applicator means positioned over said elevator for receiving labels from the label delivery station of said label supply means and applying said labels to said sections of wrapping material immediately prior to said packages being wrapped therein.

2. A packaging machine for wrapping and labeling packages as claimed in claim 1 wherein said wrapping material comprises stretch film and said sections of wrapping material are prestretched prior to application of said labels thereto.

3. A packaging machine for wrapping and labeling packages as claimed in claim 2 wherein said sections of wrapping material are held in a defined plane prior to packages being raised thereinto and said label applicator means comprises a label applier having a label applying head for engaging labels at said label delivery station and moving said labels into adhesive engagement with said sections of wrapping material, said label applier head being moved to a position below said defined plane to ensure adhesive engagement of said labels with said sections of wrapping material.

4. A packaging machine for wrapping and labeling packages as claimed in claim 3 wherein said label applying head is partially raised by packages being raised into said sections of wrapping material.

5. A packaging machine for wrapping and labeling packages as claimed in claim 3 wherein said label applying head is returned toward said label delivery station prior to packages being raised into said sections of wrapping material.

6. A packaging machine for weighing, wrapping and labeling packages containing known commodities, said packaging machine comprising:
   a package input station for receiving packages into said packaging machine;
   a combined package wrapping and labeling station including a vertically reciprocating elevator for raising packages positioned thereon into sections of wrapping material to be wrapped about said packages;

package transporting means for conveying packages from said package input station to the elevator of said combined package wrapping and labeling station;

weighing means positioned along said package transporting means for sensing the weight of packages placed onto said package input station;

a label printer located at said combined package wrapping and labeling station for printing package information, including package price, onto labels to be applied to said packages;

a label applicator positioned over said elevator at said package wrapping and labeling station for receiving labels printed by said label printer and applying them to the upper surface of sections of said wrapping material prior to elevation of said packages thereinto; and processor means for computing the price to be printed on said labels, said processor means including storage means and an input section for receiving unit pricing information regarding the commodities within said packages and being connected to said weighing means and said label printer.

7. A packaging machine for weighing, wrapping and labeling packages as claimed in claim 6 wherein said wrapping material comprises stretch film and said sections of wrapping material are prestretched prior to application of said labels thereto.

8. A packaging machine for weighing, wrapping and labeling packages as claimed in claim 7 wherein said sections of wrapping material are held in a defined plane in said combined package wrapping and labeling station prior to packages being raised thereinto and said label applicator comprises a label applying head for engaging labels printed by said label printer and moving said labels into adhesive engagement with said sections of wrapping material, said label applying head being moved to a position below said defined plane to ensure adhesive engagement of said labels with said sections of wrapping material.

9. A packaging machine for wrapping and labeling packages as claimed in claim 8 wherein said label applying head is partially raised by packages being raised into said sections of wrapping material.

10. A packaging machine for wrapping and labeling packages as claimed in claim 8 wherein said label applying head is returned toward said label delivery station prior to packages being raised into said sections of wrapping material.

11. In a packaging machine wherein packages to be wrapped and labeled are conveyed from a package input station to a package wrapping and labeling station where an elevator raises packages into sections of wrapping material which are then wrapped about said packages, a method of package labeling comprising the following steps:

drawing a section of wrapping material into said package wrapping and labeling station over said elevator;

conveying a package onto said elevator at said wrapping and labeling station;

applying a label to said section of wrapping material;

elevating said package into said section of wrapping material; and wrapping said section of wrapping material about said package.

12. A method of package labeling as claimed in claim 11 wherein said wrapping material comprises stretch film and further comprising the step of prestretching said section of wrapping material before applying a label thereto.

* * * * *